United States Patent [19]

Lanciano

[11] 4,329,620
[45] May 11, 1982

[54] CATHODE RAY TUBE WITH LIGHT TRANSPARENT PANEL AND ADHESIVE THEREFOR

[75] Inventor: Ralph L. Lanciano, Newton, Mass.

[73] Assignee: Raytheon Company, Lexington, Mass.

[21] Appl. No.: 14,784

[22] Filed: Feb. 23, 1979

[51] Int. Cl.³ .................... H01J 29/87; H01J 29/89
[52] U.S. Cl. .................................. 313/478; 358/247
[58] Field of Search ................. 313/477, 479, 478; 260/29.2 EP; 358/247

[56] References Cited

U.S. PATENT DOCUMENTS

| 3,873,868 | 3/1975 | Robinder . |
| 3,879,627 | 4/1975 | Robinder ........................ 313/466 X |
| 4,031,553 | 6/1977 | Sumiyoshi et al. . |
| 4,086,197 | 4/1978 | Bouche et al. .......... 260/29.2 EP X |
| 4,113,684 | 9/1978 | Petrie ............................ 260/29.2 EP |
| 4,179,418 | 12/1979 | Waddill ................... 260/29.2 EP X |

OTHER PUBLICATIONS

"Aliphatic Primary Amines and Their Modifiers", from *Handbook of Epoxy Resins*, Pub. 1967, pp. 7–20, 12–31, 17–26.
Dow Chemical Company Bulletin "TV Resin 720".

*Primary Examiner*—Palmer C. Demeo
*Attorney, Agent, or Firm*—John T. Meaney; Joseph D. Pannone

[57] ABSTRACT

An electron discharge device including a cathode ray tube having an evacuated envelope terminated at one end in a faceplate to which a transparent panel is bonded by an interposed adhesive layer of stabilized light-transmissive material comprising a mixture of epoxy resin and a hygroscopic curing agent having a predetermined quantity of water added thereto prior to mixing with the resin.

22 Claims, 2 Drawing Figures

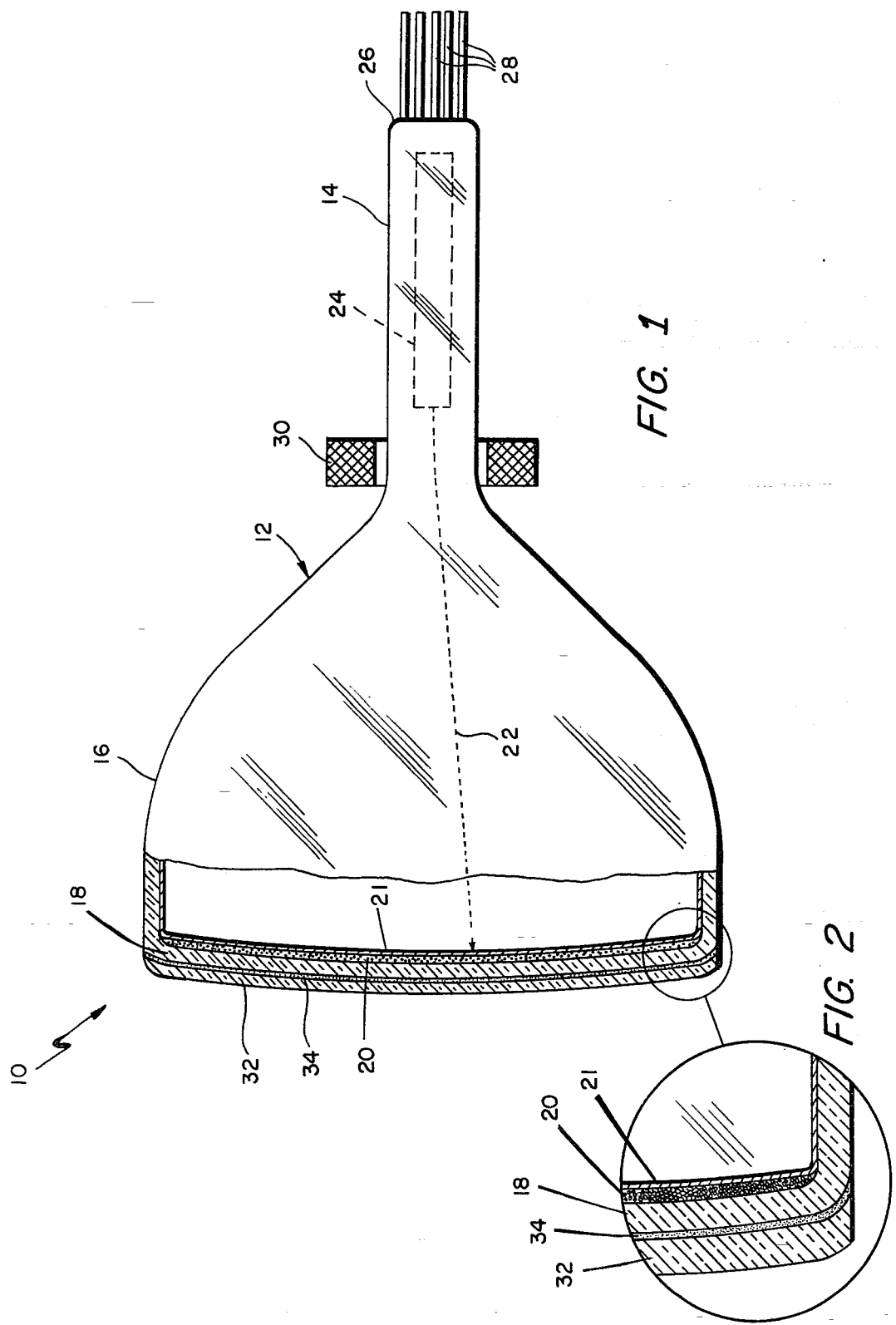

CATHODE RAY TUBE WITH LIGHT TRANSPARENT PANEL AND ADHESIVE THEREFOR

BACKGROUND OF THE INVENTION

1. Field of the Invention

This invention relates generally to light transmitting adhesive materials for bonding transparent laminates, and is more particularly concerned with an electron discharge device having a transparent portion of an evacuated envelope bonded to a transparent panel by an interposed adhesive layer of stabilized light transmissive material.

2. Discussion of the Prior Art

An electron discharge device may comprise a cathode ray tube having an evacuated envelope wherein an electron gun is disposed to direct an electron beam onto a spaced anode target. The target may be supported adjacent a transparent faceplate portion of the envelope, and include an imaging screen layer of phoshor material which flouresces locally when a discrete region thereof is penetrated by beamed electrons. Consequently, the tube usually is provided with electron focussing means for directing the electron beam onto a discrete area of the imaging screen layer. Also, the tube is provided with deflection means for causing the focussed electron beam to scan over successive areas of the imaging screen layer in a line-by-line raster pattern. Thus, by suitably modulating the intensity of the scanning electron beam, informational data may be electronically "written" on the imaging screen layer to obtain a visible light display, which may be viewed visually through the adjacent faceplate portion of the envelope.

For safety purposes, a transparent implosion panel usually is bonded to the exterior surface of the faceplate portion by an interposed layer of visible radiation transmissive material, which usually comprises an epoxy resin mixed with a curing agent. Thus, the visible light display produced by the imaging screen may be viewed through the transparent implosion panel, the visible light transmissive material of the bonding layer, and the transparent faceplate portion of the envelope. However, it is generally found, particularly when the tube is operated at relatively high temperatures, that the material of the bonding layer darkens, thereby degrading the visible light transmissive properties of the bonding material correspondingly. As a result, the informational data displayed by the imaging screen within the envelope becomes obscured, thus frustrating the purpose of operating the tube.

Therefore, it is advantageous and desirable to provide a cathode ray tube with stabilized light transmissive means for bonding the implosion panel to the faceplate portion of the envelope.

SUMMARY OF THE INVENTION

Accordingly, this invention provides a stabilized transparent adhesive material comprising a mixture of a transparent epoxy resin, a hygroscopic transparent curing agent, and a predetermined quantity of water. The invention also includes a device, such as an electron discharge device, for example, having a viewable portion over which a transparent panel is bonded by an interposed transparent layer of the stabilized adhesive material. Thus, the invention may be embodied in a cathode ray tube including an evacuated envelope having a transparent faceplate portion disposed adjacent an aligned imaging screen within the envelope, and a transparent panel bonded to the faceplate portion by an interposed light-transmissive layer of the stabilized adhesive material.

The epoxy resin preferably is initially hygroscopic and comprises a multi-functional base material, such as modified bisphenol-A epichlorohydrin, for example, which may include a mixture of aromatic and aliphatic resins. Thus, the epoxy resin may include a modifier, such as polyglycol diepoxide, for example, to provide the cured epoxy resin with improved characteristics, such as less shrinkage during curing and greater resiliency for resistance to tearing during thermal shock, for examples. The epoxy resin may be optically clear or colored with suitable dye materials for functioning as a light transmissive filter as well as bonding the transparent panel to the faceplate portion of the envelope.

The curing agent preferably comprises a catalytic hardener material, such as boron trifluoride etherate, for example. Alternatively, the curing agent may comprise an amine hardener, such as triethylene tetramine, boron trifluoride monoethylamine, or methyl dianiline, for examples. The epoxy agent may be optically clear or colored with suitable dye materials for providing the light transmissive layer with desired filtering properties.

The stabilizing component of the mixture is an additive quantity of chemically pure water, such as distilled water or deionized water, for examples. The additive quantity of water is in the range of approximately two to five percent by weight and preferably comprises about three to four percent by weight of the curing agent prior to mixing with the epoxy resin. A suitable quantity of curing agent may be in the range of six to ten percent by weight and preferably comprises about eight percent by weight of the epoxy resin. In accordance with this invention, chemically pure water is added to the curing agent; and the resulting composite solution is mixed with the epoxy resin for applying between the transparent panel and the faceplate portion of the envelope. The curing agent reacts with the epoxy resin thereby causing it to polymerize or gel and produce the light transmissive layer of adhesive material, which preferably has a generally rubber-like composition and is substantially impervious to external moisture.

It is generally held that moisture seriously inhibits the cure mechanism of the curing agent, and may destroy its ability to cure the epoxy resin. Also, it is the general opinion of those skilled in the art that once the curing agent has been inhibited by moisture, the epoxy resin will not cure within any reasonable cure schedule. Consequently, precautionary measures, such as moisture proof containers, dessicant packing, and automatic dispensing machines, for example, generally are recommended to avoid introducing moisture into the epoxy bonding process. However, in the practice of this invention, it has been found that when the specified quantity of water is added to the curing agent prior to mixing with the epoxy resin, the gel time generally is less than five minutes. Furthermore, when the tube is subsequently subjected to relatively high operating temperatures, such as 125° C., for example, the adhesive material of the light transmissive layer does not darken and degrade the visibility of the imaging screen as may be expected with similar prior art tubes not having the water stabilizing component in the adhesive material.

BRIEF DESCRIPTION OF THE DRAWING

For a better understanding of the invention, reference is made in the following detailed description to the drawing wherein:

FIG. 1 is an elevational view, partly in section, of a cathode ray tube embodying the invention; and FIG. 2 is an enlarged, fragmentary, axial sectional view of the encircled area shown in FIG. 1.

DESCRIPTION OF THE PREFERRED EMBODIMENT

Referring to the drawing wherein like characters of reference designate like parts, there is shown in FIG. 1 a cathode ray tube 10 comprising an evacuated envelope 12 made preferably of dielectric vitreous material, such as glass, for example. Envelope 12 includes a neck end portion 14 and an opposing larger diameter end portion 16 which terminates at one end of envelope 12 in a peripherally sealed faceplate 18. The faceplate 18 is made of optically transparent material, such as glass, for example, and has disposed on its inner surface an anode imaging screen layer 20 of fluorescent material, such as zinc sulfide, for example. Deposited on the inner surface of imaging screen layer 20 may be a relatively thin coating 21 of electrically conductive material, such as aluminum, for example, which is connected to an anode terminal (not shown) of the tube 10.

Imaging screen layer 20 is scanned in a well-known manner by an electron beam 22 emanating from a conventional electron gun 24 axially disposed in neck end portion 14. The neck end portion 14 terminates at the other end of envelope 12 in a peripherally sealed, stem press 26 having extended hermetically through it a circular array of terminal pins 28. The pins 28 provide means for making external connection to electrically connected elements of the gun 24 and controlling the intensity of the electron beam emanating therefrom. Adjacent the larger diameter end portion 16 of envelope 12, the neck end portion 14 is insulatingly encircled by an electromagnetic yoke coil 30, which provides means for controlling lateral deflection of the electron beam 22 impinging on imaging screen layer 20.

In operation, a variable electrical current flows through the yoke coil 30 and produces a correspondingly variable magnetic field which causes the electron beam 22 to scan over successive discrete areas of the imaging screen layer 30 in a well-known raster pattern. As the scanning electron beam impinges on each discrete area of the imaging screen layer 20, the material thereof fluoresces locally in accordance with the instantaneous intensity of the beam. Consequently, during scanning, the intensity of beam 22 may be suitably modulated in gun 24 for producing on imaging screen layer 20 a visible light image having suitable brightness for visual viewing through the adjacent transparent faceplate 18.

As shown more clearly in FIG. 2, the tube 10 includes a protective implosion panel 32 made of optically transparent material, such as glass or plastic, for examples, and bonded to the outer surface of faceplate 18 by an interposed, light transmissive layer 34 of adhesive material. The adhesive material may be injected in liquid form through a filler hole of a suitable mold (not shown) which supports the faceplate 18 in substantially uniform spaced relationship with panel 32. As a result, the adhesive material drives air out through a vent hole in the mold and fills the resulting space between faceplate 18 and panel 32. After curing, the adhesive material of layer 34 is strongly adherrent and firmly bonds the panel 32 to the faceplate 18. The cured adhesive material of layer 34 also is required to be sufficiently light transmissive for permitting the image produced on imaging screen layer 22 in envelope 12 to be viewed through the implosion panel 32 and the faceplate 18. However, in similar tubes of the prior art, it has been found, particularly when the tube is subjected to relatively high operating temperatures, that the adhesive material bonding the implosion panel to the faceplate of a cathode ray tube darkens considerably and degrades visibility of the image produced by the tube.

In accordance with this invention, the adhesive material of layer 34 comprises a mixture of a transparent epoxy resin, a hygroscopic transparent curing agent, and an additive quantity of water which constitutes the stabilizing component of the mixture. The epoxy resin component preferably is hygroscopic and comprises a multi-functional base material, such as modified bisphenol-A epichlorahydrin, for example, which may include a mixture of aromatic and aliphatic resins. Thus, the epoxy resin may include a modifier, such as polygychol diepoxide, for example, to provide the composite epoxy resin with improved characteristics, such as less shrinkage during curing and greater resiliency for resistance to tearing during wide variations in temperature, for examples. The epoxy resin component of the mixture may be optically clear or suitably colored with suitable dye materials for functioning as a light transmissive filter as well as bonding the panel 32 to the faceplate 18.

The curing agent component of the mixture preferably comprises a catalytic hardener, such as boron trifluoride etherate, for example. Alternatively, the curing agent may comprise an amine hardener, such as triethylene tetramine, boron trifluoride monoethylamine, or methyl dianiline, for examples. The curing agent may be optically clear or colored with suitable dye materials for providing the light transmissive layer 34 with desired filtering properties. A suitable quantity of the curing agent component may be in the range of approximately six to ten percent by weight and preferably comprises about eight percent by weight of the epoxy resin component.

The stabilizing component of the mixture comprises chemically pure water, such as distilled water, for example, in a quantity of approximately two to five percent by weight and preferably about three to four percent by weight of the curing agent component prior to mixing with the epoxy resin component. Thus, if the epoxy resin component weighs one hundred grams, the curing agent component may weigh about eight grams and the distilled water component may weigh about twenty-five hundredths of a gram, for example. In accordance with this invention, the distilled water component is added to the curing agent component; and the composite is mixed thoroughly with the epoxy resin component just prior to applying the resulting mixture between the faceplate 18 and the panel 32. Because of the hygroscopic nature of the curing agent and possibly of the epoxy resin as well, mixing of the components and injection of the resulting mixture between faceplate 18 and panel 32 preferably is carried out with use of a commercially available, automatic dispensing machine.

Prior to mixing the components, the epoxy resin component and the envelope 12 of tube 10 are preferably preheated to a suitable temperature, such as in the range of approximately forty to eighty degrees Centigrade and preferably about fifty degrees Centigrade, for example. Preheating of the epoxy resin insures a thorough mixing thereof with the curing agent and distilled water components, which are pre-mixed thoroughly with one another by suitable means, such as rolling in a sealed container, for example. Preheating of the faceplate 12 and possibly of the panel 32 may be required to insure that the resulting exothermic reaction produced by the injected mixture will proceed at a suitable rate for providing the layer 34 with desired adhesive and light transmissive properties. As a result, the injected mixture gels in less than five minutes to produce the light transmissive layer 34 of adhesive material which bonds panel 32 to the outer surface of faceplate 18. The material of layer 34 may be post-cured in a temperature range of about forty to fifty degrees Centigrade for approximately one hour, if desired, to assure a complete curing of the material in layer 34. It has been found that when the tube 10 is subsequently subjected to a relatively high operating temperature, such as one hundred and twenty-five degrees Centigrade, for example, the darkening of adhesive material in layer 34, which would be expected to occur in similar tubes of the prior art, does not occur in the tube 10.

Thus, there has been disclosed herein a stabilized adhesive material comprising a mixture of a transparent epoxy resin, a hygroscopic transparent curing agent, and an additive quantity of water. This stabilized adhesive material is especially suitable for forming a light transmissive layer which bonds an implosion panel to a faceplate portion of a cathode ray tube envelope. However, the stabilized adhesive material of this invention also may be used for bonding transparent laminates on a viewable portion of other devices, such as on an output faceplate portion of an image intensifier tube envelope, for example. Moreover, although the stabilizing water component of the mixture has been described herein as preferably being added to the curing agent prior to mixing with the epoxy resin, the water may be added to the epoxy resin prior to mixing with the curing agent or may be added simultaneously therewith.

From the foregoing, it will be apparent that all of the objectives of this invention have been achieved by the structures shown and described. It also will be apparent, however, that various changes may be made by those skilled in the art without departing from the spirit of the invention as expressed in the appended claims. It is to be understood, therefore, that all matter shown and described herein is to be interpreted as illustrative rather than in a limiting sense.

What is claimed is:

1. A device comprising:
    a body having a viewable portion;
    a light transmissive layer of gelled adhesive material having a surface bonded to the viewable portion of the body and having an opposing surface, the gelled adhesive material comprising a mixture of transparent epoxy resin, a hygroscopic transparent curing agent, and a light transmission stabilizing agent consisting of a predetermined additive quantity of water; and
    a transparent laminate disposed over the light transmissive layer and bonded to the opposing surface thereof.

2. A device as set forth in claim 1 wherein the epoxy resin includes a multi-functional base epoxy resin.

3. A device as set forth in claim 2 wherein the base epoxy resin comprises bisphenol-A epichlorohydrin.

4. A device as set forth in claim 3 wherein the epoxy resin includes a modifier epoxy resin.

5. A device as set forth in claim 4 wherein the modifier comprises polyglycol epoxide.

6. A device as set forth in claim 1 wherein the curing agent comprises an acid type hardener.

7. A device as set forth in claim 6 wherein the acid type curing agent is boron trifluoride etherate.

8. A device as set forth in claim 1 wherein the curing agent comprises a base type hardener.

9. A device as set forth in claim 8 wherein the base type hardener is an amine epoxy hardener.

10. An electron discharge device including:
    an evacuated envelope provided with a radiation transparent portion having an outer surface;
    a radiation transparent panel disposed adjacent the outer surface of the radiation transparent portion and aligned therewith; and
    a radiation transmissive layer of gelled adhesive material having respective opposing surfaces bonded to the outer surface of the radiation transparent portion and to the panel, the gelled adhesive material comprising a mixture of epoxy resin, a hygroscopic curing agent, and a radiation transmission stabilizing agent consisting of a predetermined additive quantity of water.

11. An electron discharge device as set forth in claim 10 wherein the epoxy resin comprises a light transmissive epoxy resin.

12. An electron discharge device as set forth in claim 11 wherein the light transmissive epoxy resin includes bisphenol-A epichlorohydrin.

13. An electron discharge device as set forth in claim 10 wherein the curing agent comprises a boron trifluoride compound.

14. An electron discharge device as set forth in claim 10 wherein the curing agent is boron trifluoride etherate.

15. A cathode ray tube including:
    an evacuated envelope provided with a light-transparent faceplate portion having an outer surface;
    an imaging screen disposed within the envelope and adjacent the faceplate portion;
    a light-transparent panel disposed adjacent the outer surface of the faceplate portion and aligned therewith; and
    a light-transmissive layer of gelled adhesive material having respective opposing surfaces bonded to the outer surface of the faceplate portion and to the panel; the gelled adhesive material comprising a mixture of epoxy resin, a hygroscopic curing agent, and a light transmission stabilizing agent consisting of a predetermined additive quantity of water.

16. A cathode ray tube as set forth in claim 15 wherein the epoxy resin includes a multi-function base resin and a modifier.

17. A cathode ray tube as set forth in claim 16 wherein the base resin includes bisphenol-A epichlorohydrin.

18. A cathode ray tube as set forth in claim 15 wherein the curing agent comprises boron trifluoride etherate.

19. A cathode ray tube as set forth in claim 15 wherein the curing agent comprises an amine hardener.

20. A cathode ray tube as set forth in claim 15 wherein the water is chemically pure water.

21. A cathode ray tube as set forth in claim 15 wherein the curing agent comprises about six to ten percent by weight of the epoxy resin.

22. A cathode ray tube as set forth in claim 15 wherein the water comprises about two to five percent by weight of the curing agent.

* * * * *